(12) United States Patent
Koeda et al.

(10) Patent No.: US 10,933,559 B2
(45) Date of Patent: Mar. 2, 2021

(54) METHOD OF PRODUCING SPARK PLUG INSULATOR

(71) Applicant: DENSO CORPORATION, Kariya (JP)

(72) Inventors: Katsumasa Koeda, Kariya (JP); Hiroshi Araki, Kariya (JP)

(73) Assignee: DENSO CORPORATION, Kariya (JP)

( * ) Notice: Subject to any disclaimer, the term of this patent is extended or adjusted under 35 U.S.C. 154(b) by 284 days.

(21) Appl. No.: 15/745,208

(22) PCT Filed: Jul. 5, 2016

(86) PCT No.: PCT/JP2016/069828
§ 371 (c)(1),
(2) Date: Jan. 16, 2018

(87) PCT Pub. No.: WO2017/014038
PCT Pub. Date: Jan. 26, 2017

(65) Prior Publication Data
US 2018/0272563 A1    Sep. 27, 2018

(30) Foreign Application Priority Data

Jul. 17, 2015 (JP) .............................. JP2015-143199

(51) Int. Cl.
*B28B 11/24* (2006.01)
*H01T 13/38* (2006.01)
(Continued)

(52) U.S. Cl.
CPC .............. *B28B 11/243* (2013.01); *B28B 3/02* (2013.01); *C01F 7/021* (2013.01); *C04B 35/111* (2013.01);
(Continued)

(58) Field of Classification Search
CPC .................. B28B 11/243; B28B 3/02
See application file for complete search history.

(56) References Cited

U.S. PATENT DOCUMENTS

| | | | | |
|---|---|---|---|---|
| 3,849,850 A | * | 11/1974 | Goutard | H01T 21/02 445/67 |
| 5,210,458 A | * | 5/1993 | McDougal | H01T 13/40 313/130 |
| 6,432,353 B1 | | 8/2002 | Michiura | |
| 2008/0042539 A1 | * | 2/2008 | Walker | C04B 35/111 313/135 |

(Continued)

FOREIGN PATENT DOCUMENTS

| CN | 103145406 A | 6/2013 |
|---|---|---|
| JP | 5-62657 | 3/1993 |

(Continued)

OTHER PUBLICATIONS

Whittaker, Sintering furnace atmosphere control and optimization, Powder Metallurgy Review, Jul. 6, 2011, available at https://www.pm-review.com/articles/sintering-furnace-atmosphere-control-and-optimisation/ (Year: 2011).*

(Continued)

*Primary Examiner* — Joseph S Del Sole
*Assistant Examiner* — Melody Tsui
(74) *Attorney, Agent, or Firm* — Nixon & Vanderhye PC

(57) ABSTRACT

Provided are a molding step (A) of preparing an alumina molded body 11 from a molding raw material which contains an alumina raw material powder having an average particle size of 2 μm to 5 μm and a molding additive, and a sintering step (B) of preparing an alumina molded body 12, which becomes a spark plug insulator 1, by sintering the alumina molded body 11. At the sintering step (B), the alumina molded body 11 is conveyed to a continuous furnace 100 provided with a heating zone Z1 which is heated to 700° C. to 1600° C. by a heating means 401, followed by introducing oxygen gas to control the heating zone Z1 to have a high oxygen atmosphere with an oxygen concentration exceeding 20 mol %.

7 Claims, 5 Drawing Sheets

(51) Int. Cl.
*C04B 35/111* (2006.01)
*H01T 21/02* (2006.01)
*C04B 35/626* (2006.01)
*B28B 3/02* (2006.01)
*C01F 7/02* (2006.01)
*H01B 19/00* (2006.01)
*H01T 13/20* (2006.01)
*H01B 17/56* (2006.01)

(52) U.S. Cl.
CPC ....... *C04B 35/62695* (2013.01); *H01B 19/00* (2013.01); *H01T 13/38* (2013.01); *H01T 21/02* (2013.01); *C01P 2004/61* (2013.01); *C01P 2006/80* (2013.01); *C04B 2235/5436* (2013.01); *C04B 2235/6562* (2013.01); *C04B 2235/6567* (2013.01); *C04B 2235/6583* (2013.01); *C04B 2235/6584* (2013.01); *C04B 2235/6585* (2013.01); *C04B 2235/72* (2013.01); *C04B 2235/96* (2013.01); *H01B 17/56* (2013.01); *H01T 13/20* (2013.01)

(56) References Cited

U.S. PATENT DOCUMENTS

| | | |
|---|---|---|
| 2010/0084960 A1* | 4/2010 | Kurono .............. H01B 1/12 |
| | | 313/118 |
| 2012/0319556 A1 | 12/2012 | Suzuki et al. |
| 2015/0047880 A1 | 2/2015 | Takaoka et al. |
| 2015/0288150 A1 | 10/2015 | Takaoka et al. |
| 2019/0076922 A1* | 3/2019 | Malas .............. F27D 19/00 |

FOREIGN PATENT DOCUMENTS

| | | |
|---|---|---|
| JP | 5-62857 | 3/1993 |
| JP | 2000-100546 | 4/2000 |
| JP | 2000100546 A * | 4/2000 |

OTHER PUBLICATIONS

Von Stark (Handbook of Thermoprocessing Technologies: Fundamentals, Processes, Components, Safety, Axel von Starck, Alfred Muhlbauer, Carl Kramer Vulkan-Verlag GmbH, 2005—Materials—807 page, p. 631) (Year: 2005).*

* cited by examiner

METHOD OF PRODUCING SPARK PLUG INSULATOR

This application is the U.S. national phase of International Application No. PCT/JP2016/069828 filed 5 Jul. 2016, which designated the U.S. and claims priority to JP Patent Application No. 2015-143199 filed 17 Jul. 2015, the entire contents of each of which are hereby incorporated by reference.

TECHNICAL FIELD

The present invention relates to a method of producing a spark plug insulator which uses an alumina sintered body as a base material.

BACKGROUND ART

Spark plug insulators used in internal combustion engines are mainly configured by a high-voltage-resistant ceramic insulating material. Ceramic insulating materials have been obtained by pressing and molding an alumina powder into a desired shape, followed by holding the pressed and molded alumina powder for approximately 1 to 2 hours under conditions of sintering the alumina. As prior art, Patent Literature 1 describes that a component selected from Group 2 of the Periodic Table, and also a rare earth component, are added as sintering additives to an insulating material. The content ratio of each component is adjusted to accomplish high voltage resistance.

CITATION LIST

Patent Literature

[PTL 1]: JP 2013-175381 A

SUMMARY OF THE INVENTION

Technical Problem

The insulating material described in Patent Literature 1 is mainly composed of a crystalline phase, a glass phase and an intermediate phase formed at an interface between the crystalline phase and the glass phase. However, the range of the composition of the insulating material is quite limited. Specifically, the particle size of the crystalline phase in the insulating material, the area ratio of the glass phase and the crystalline phase, and the thickness of the intermediate phase are limited. More specifically, formulation of the raw material and the manufacturing process needs to be highly controlled. However, by controlling formulation of the raw material or the manufacturing process, sintering of the insulating material is unlikely to be progressed. To progress sintering of the insulating material, sintering should be carried out for a long time, but doing so may leave a concern that productivity is decreased.

The present invention has been achieved in view of the problems stated above, and is intended to provide a method of producing a spark plug insulator that can improve voltage resistance and accomplish high productivity. In this producing method, formulation of the raw material and the manufacturing process does not need to be highly controlled, and also long time sintering is not required.

Solution to Problem

An aspect of the present invention is a method of producing a spark plug insulator including a molding step of preparing an alumina molded body from a molding raw material which contains an alumina raw material powder having an average particle size of 2 µm to 5 µm and a molding additive; and a sintering step of preparing an alumina sintered body, which becomes a spark plug insulator, by sintering the alumina molded body. In the sintering step, the alumina molded body is conveyed through a continuous furnace provided with a heating zone which is heated to 700° C. to 1600° C. by a heating means, while introducing oxygen gas to the continuous furnace, to control the heating zone to have a high oxygen atmosphere with an oxygen concentration exceeding 20 mol %.

Advantageous Effects of the Invention

In the aforementioned method of producing a spark plug insulator, oxygen gas is introduced into the heating zone of a continuous furnace to conduct sintering under a high oxygen atmosphere of 20 mol % or more. When adjacent alumina particles are bonded to one another while shrinking during the sintering step of an alumina sintered body, atmospheric gas is trapped in the gaps between the particles. Among the atmospheric gas, oxygen gas has been confirmed to permeate the alumina particles and is released at a high temperature of 1,200° or more. Therefore, the oxygen concentration in the atmospheric gas is increased to release a large amount of oxygen from inside the alumina particles during sintering. Accordingly, the gaps between the particles can be further reduced to accelerate the sintering of alumina.

Consequently, use of an alumina raw material powder with a relatively large average grain diameter can accomplish a high sintering density in a short time. Further, no sintering additive is required to be added to the raw material powder, which means formulation of the raw material, or the sintering step, does not need to be highly controlled. Accordingly, a spark plug insulator that is industrially advantageous and has a high voltage resistance can be produced with high productivity.

As stated above, according to the aforementioned aspect, the method of producing a spark plug insulator that can improve voltage resistance and accomplish high productivity without adding any sintering additive and without needing a long sintering time, can be provided.

DESCRIPTION OF EMBODIMENTS

First Embodiment

Figure 1:
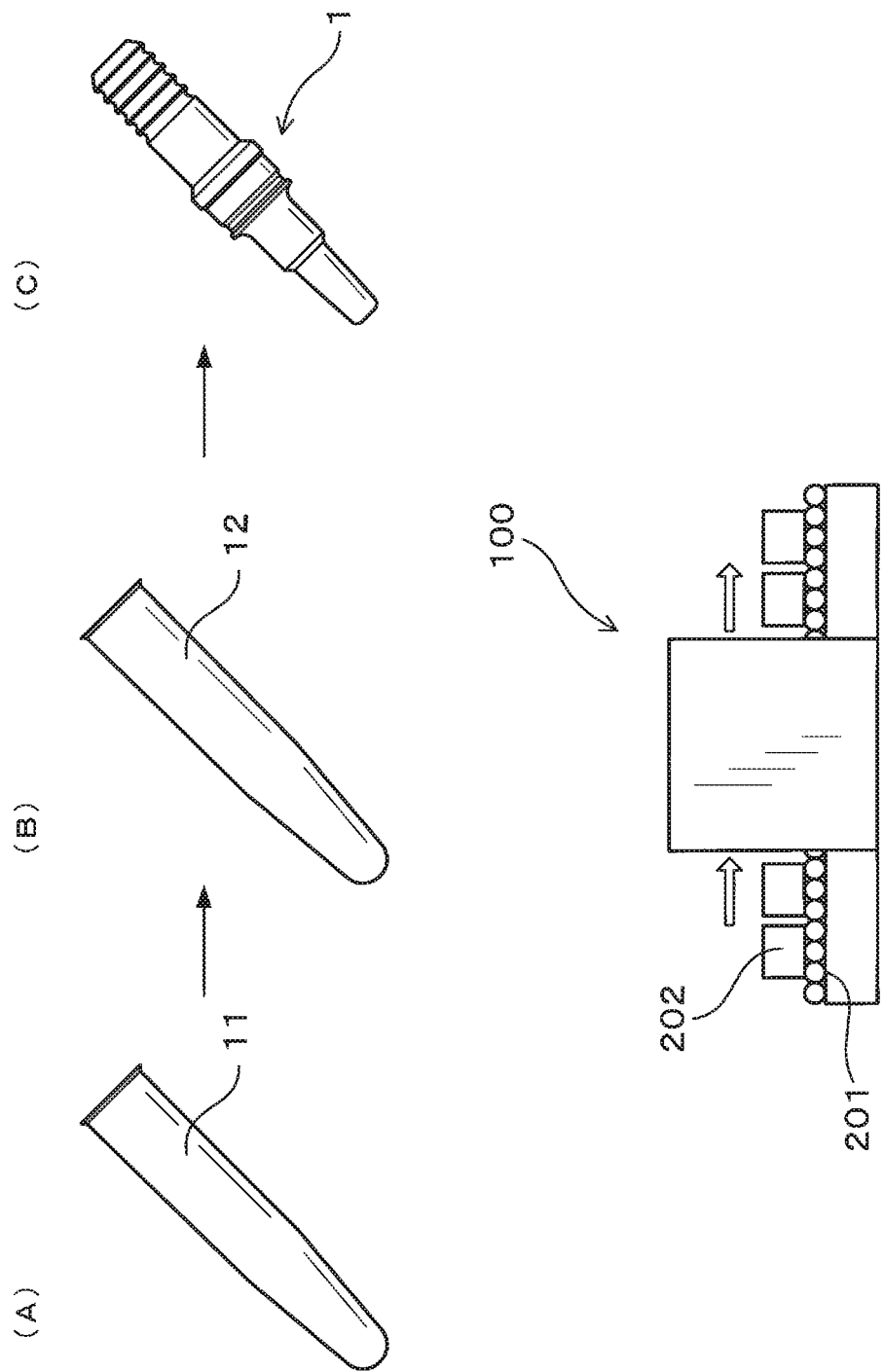
FIG. 1 is a set of diagrams of a manufacturing process a spark plug insulator according to a first embodiment.
Figure 2:
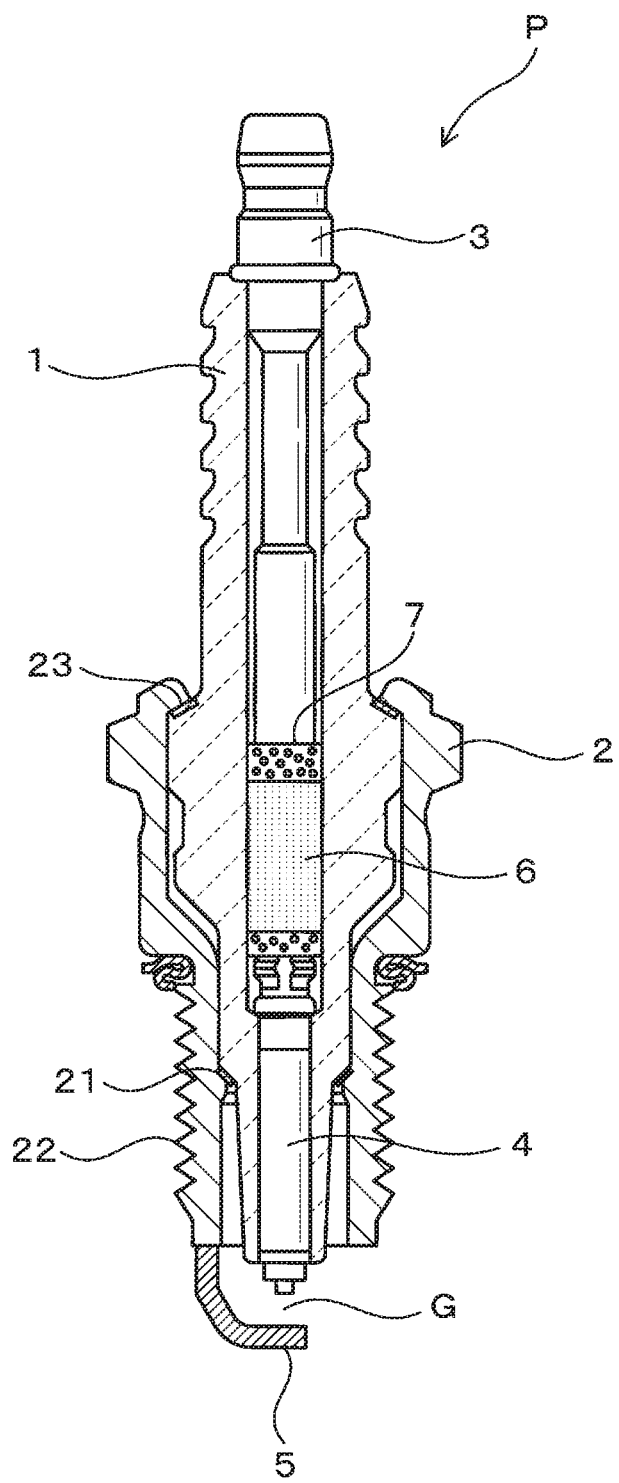
FIG. 2 is a partial sectional diagram showing an overall structure of a spark plug including the spark plug insulator according to the first embodiment.
Figure 3:
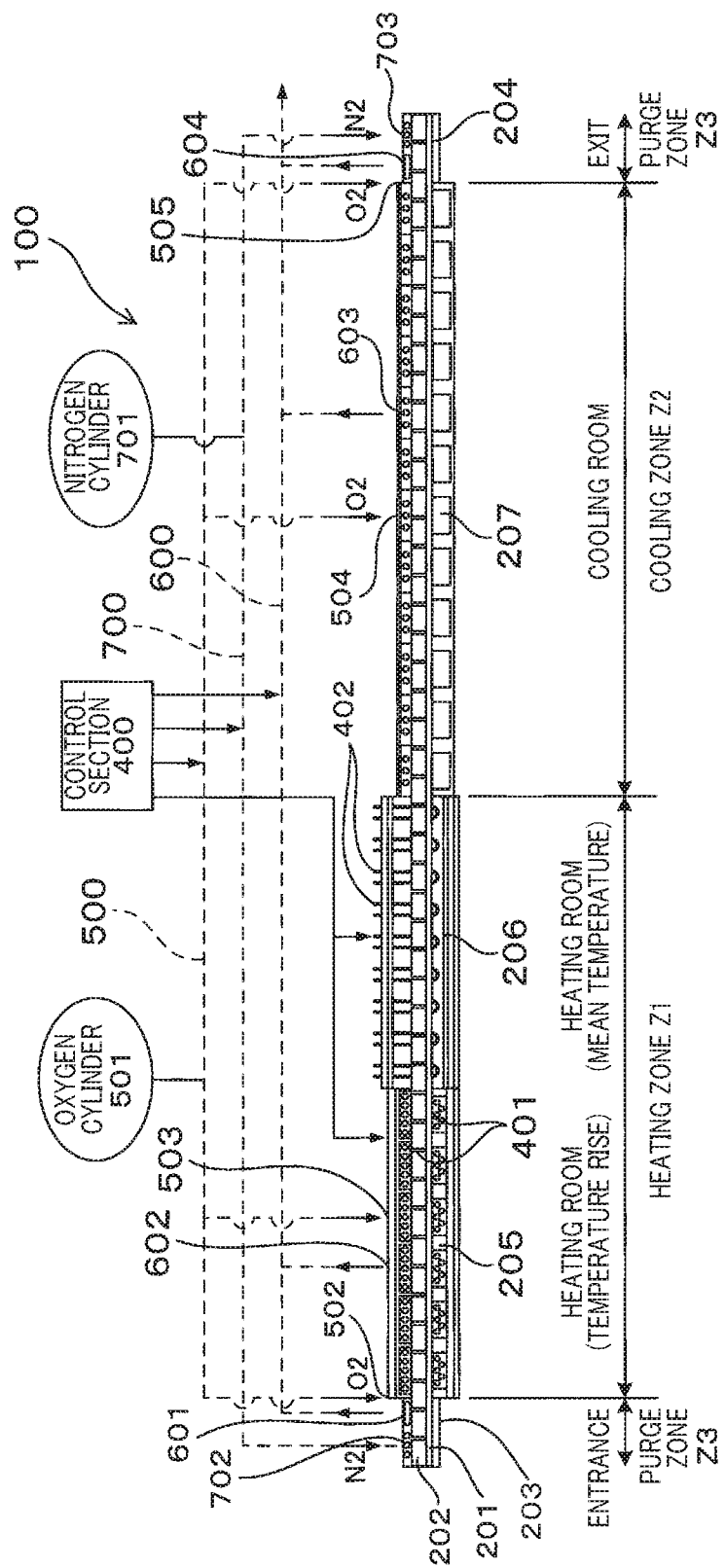
FIG. 3 is an overall cross-sectional diagram showing a detailed configuration example of a continuous furnace used at the sintering step of the spark plug insulator according to the first embodiment.

Referring to FIGS. 1 to 3, a method of producing a spark plug insulator according to a first embodiment will be described. As shown in FIG. 1, a spark plug insulator 1 is an electrical insulator with a predetermined shape having an alumina sintered body 12 serving as the base material. The alumina sintered body 12 is prepared by sintering an alumina molded body 11 molded in a molding step (A) using a sintering step (B). The sintering step (B) uses a continuous furnace 100 having a heating zone. Oxygen gas is introduced into the continuous furnace 100 to control the heating zone to have a high oxygen atmosphere with an oxygen concentration exceeding 20 mol %. The obtained alumina sintered body 12 is ground into a predetermined shape through a grinding step (C), thereby producing the spark plug insulator 1. The details of each step will be described below.

The molding step (A) is a step of preparing the alumina molded body 11 from a molding raw material which contains an alumina raw material powder having an average particle size of 2 μm to 5 μm and a molding additive. It is desirable that the alumina raw material powder serving as the molding raw material is high purity alumina which may contain inevitable impurities but does not contain metallic elements other than Al. A known organic binder can be used for the molding additive. Generally, no sintering additive is added to the molding raw material. A known press molding device can be used for the molding step (A). For example, molding is conducted by filling the molding raw material into a cylindrical space formed between a pair of mold, followed by pressing.

The sintering step (B) is a step for sintering the obtained alumina molded body 11 to prepare the alumina sintered body 12 which becomes the spark plug insulator 1. The alumina molded body 11, as shown in FIG. 1, is accommodated inside a container 202 mounted on a conveyor 201, and is transferred into a continuous furnace 100 having a tunnel furnace configuration. The alumina molded body 11 turns into the alumina sintered body 12 while passing through the heating zone inside the continuous furnace 100. The continuous furnace 100 is provided with a heating means for heating the heating zone to 700 to 1600° C. Heating means can be optionally selected, but may preferably be one which does not consume oxygen in the heating zone, such as an electrical heating device. The electrical heating device to be used may be of an induction heating type, other than of a resistance heating type, such as an electric heater. A gas burner type heating device may be used as long as a predetermined high oxygen concentration can be maintained within the heating zone.

The grinding step (C) is a step for grinding the alumina sintered body 12 into a product form. A known grinding device can be used for the grinding step (C). For example, a grinding tool suitable for the product form is brought into contact with the outer periphery of the alumina sintered body 12 for grinding it to produce the spark plug insulator 1.

FIG. 2 shows a configuration example of a spark plug P applied to automobile engines. As shown in FIG. 2, the spark plug P includes the spark plug insulator 1, a metal housing 2, a terminal metal fitting 3, a center electrode 4 and a ground electrode 5. The spark plug insulator 1 has a cylindrical shape. The metal housing 2 has a cylindrical shape and holds the spark plug insulator 1 via the outer periphery thereof. The terminal metal fitting 3 and the center electrode 4 are held on the inside of the spark plug insulator 1. The ground electrode 5 is fixed to the metal housing 2. In FIG. 2, a base end is defined to be an end of the center electrode 4 on a resistor 6 side in the axial direction of the center electrode 4. In the figure, a tip end is defined to be an end of the center electrode 4 on an opposite side of the base end in the axial direction of the center electrode 4. The tip end of the center electrode 4 is protruded from the cylindrical spark plug insulator 1. The tip end of the center electrode 4 faces the ground electrode 5 in an L-shape via a gap G The resistor 6, which contains glass as a main component mixed with carbon, is arranged between the terminal metal fitting 3 and the center electrode 4 via a glass sealing 7 that contains copper and glass. The metal housing 2 has a mounting thread portion 22 formed on the outer periphery of the metal housing 2. The tip end side of the mounting thread portion 22 is provided with a metal packing 21 which is arranged between an outer periphery stepped portion of the spark plug insulator 1 and the mounting thread portion 22. The metal housing 2 has a portion in contact with the spark plug insulator 1 on the terminal metal fitting 3 side. The portion is swaged and fixed to the stepped portion of the outer periphery of the spark plug insulator 1 via a metal ring 23. Accordingly, the space between the metal housing 2 and the spark plug insulator 1 is hermetically sealed.

FIG. 3 is a sintering configuration example of the continuous furnace 100 provided with a furnace body and feed-in/feed-out opening portions. The furnace body has a tunnel shape extending to the lateral direction in FIG. 3. The feed-in/feed-out opening portions are connected to both ends of the furnace body so as to face each other in the longitudinal direction of the furnace body. The conveyor 201 for conveying a number of containers 202 is formed in the continuous furnace 100 in the longitudinal direction thereof. The conveyor 201 is a roller type conveyor configured by a number of conveying rollers installed at regular intervals, for example, in the conveying direction (i.e., in the longitudinal direction of the continuous furnace 100). Specifically, each conveying roller is made rotatable and densely installed on a straight line in the rotating direction. In the conveying direction, the conveyor 201 passes through the two opposing sidewalls of the continuous furnace 100. A number of containers 202 are conveyed by a driving means, not shown, with unidirectional rotation of the conveying rollers.

Each container 202 can be used as a heat resistant tray that can accommodate a predetermined number of aligned alumina molded bodies 11 each of which becomes a spark plug insulator 1. The container 202 may be a laminate or the like of the heat resistance trays. The furnace body has an entrance 203 and an exit 204. The entrance 203 is provided on one end side of the furnace body to face the conveying flow. The exit 204 is provided at an end of the furnace body so as to face the entrance 203 in the conveying direction. The container 202 is conveyed in the conveying direction on the conveyor 201 from the entrance 203 toward the exit 204. A container 202 leaving the exit 204 is transferred to the subsequent step via a transferring means, not shown.

The continuous furnace 100 is divided into a plurality of regions so that the sintering step proceeds with good controllability. The furnace body has an interior divided into a heating zone Z1 and a cooling zone Z2, which are arranged in this order from the entrance 203. The entrance 203 and the exit 204 are provided as purge zones Z3 on both ends of the furnace body in the conveying direction. The heating zone Z1 is provided with a temperature rising heating chamber 205 and an isothermal heating chamber 206, which are arranged in this order from the entrance 203. The cooling zone Z2 is provided with a cooling chamber 207.

The alumina molded body 11 is preliminarily heated in the temperature rising heating chamber 205. The temperature of the alumina molded body 11 in the isothermal heating chamber is maintained at not less than a predetermined sintering temperature. The heating zone Z1 is provided with an electrical heating means. For example, a plurality of electric heaters 401 are provided on the upper surface and on the bottom surface of the temperature rising heating chamber 205 to ensure heating of the containers 202 that are conveyed into the temperature rising heating chamber 205. The isothermal heating chamber 206 is arranged with a plurality of thermocouples 402 protruding from the upper surface of the isothermal heating chamber 206 towards the conveyor 201. The isothermal heating chamber 206 is also arranged with an electric heater, not shown. The continuous furnace 100 includes a control section 400 that controls the power supplied to the electric heater 401 using a detection result of the thermocouples 402. At this time, the temperature rising heating chamber 205 and the isothermal heating chamber 206 are ensured to create respective desired temperature distributions.

The heating zone Z1 and the cooling zone Z2 are connected to an oxygen introduction path 500 and an exhaust path 600, respectively. By introducing an oxygen gas into the heating zone Z1 and the cooling zone Z2 through the oxygen introduction path 500, the oxygen concentration in the continuous furnace 100 can be controlled to a predetermined level. The oxygen introduction path 500 and the exhaust path 600, as well as a nitrogen introduction path 700, are connected to the purge zone Z3. The oxygen introduction path 500 and the nitrogen introduction path 700 are respectively connected to an oxygen cylinder 501 serving as an oxygen source and a nitrogen cylinder 701 serving as a nitrogen source. The control section 400 controls the opening/closing of control valves, not shown, provided in the oxygen introduction path 500 and the nitrogen introduction path 700. Accordingly, the amount of oxygen gas or nitrogen gas introduced to the heating zone Z1, the cooling zone Z2, and the purge zone Z3 is controlled.

The entrance 203 corresponds to the purge zone Z3 located at an upstream end of the heating zone Z1 in the conveying direction. The exit 204 corresponds to the purge zone Z3 located at a downstream end of the cooling zone Z2 in the conveying direction. Nitrogen gas, that is an inactive gas, is discharged to fill the entrance 203 and the exit 204. Accordingly, the flow of outside air into the furnace body is blocked so as to easily control the sintering atmosphere. The upper surface of the entrance 203 is provided with a nitrogen introduction port 702, an exhaust port 601 and an oxygen introduction port 502, in this order from the upstream end of the furnace body in the conveying direction. The nitrogen introduction port 702 is an aperture communicating with the nitrogen introduction path 700 to introduce nitrogen gas thereto. The exhaust port 601 is an aperture communicating with the exhaust path 600 for discharging the atmospheric gas in the entrance 203 to the outside. The oxygen introduction port 502 is an aperture communicating with the oxygen introduction path 500 for introducing oxygen gas. The upper surface of the exit 204 is provided with an oxygen introduction port 505, an exhaust port 604 and a nitrogen introduction port 703, which are arranged in this order from the entrance 203. The oxygen introduction port 505 is an aperture communicating with the oxygen introduction path 500 to introduce oxygen gas thereto. The exhaust port 604 is an aperture communicating with the exhaust path 600 for discharging the atmospheric gas in the exit 204 to the outside. The nitrogen introduction port 703 is an aperture communicating with the nitrogen introduction path 700 for introducing nitrogen gas.

Accordingly, the atmospheric gas in the entrance 203 of the purge zone Z3 is purged with nitrogen gas introduced from the nitrogen introduction port 702. Similarly, the atmospheric gas in the exit 204 is purged with nitrogen gas introduced from the nitrogen introduction port 703. The atmospheric gas expelled by nitrogen gas is discharged from the exhaust port 601 located in between the nitrogen introduction port 702 and the oxygen introduction port 502, and from the exhaust port 604 located between the nitrogen introduction port 703 and the oxygen introduction port 505. Accordingly, the oxygen concentration in the purge zone Z3 can be controlled based on the amount of the oxygen introduced from the oxygen introduction ports 502 and 505, without being affected by the outside air.

In the heating zone Z1, the temperature rising heating chamber 205 has an intermediate portion of which the upper surface is provided with the exhaust port 602 and the oxygen introduction port 503 arranged in this order from the entrance 203. The exhaust port 602 is an aperture communicating with the exhaust path 600 to discharge the atmospheric gas in the temperature rising heating chamber 205 to the outside. The oxygen introduction port 503 is an aperture communicating with the oxygen introduction path 500 to introduce oxygen gas. Since the electrical heating device is in the heating zone Z1, the oxygen will not be consumed by combustion. Accordingly, the oxygen concentration in the heating zone Z1 never becomes low, and thus oxygen introduction into the isothermal heating chamber 206 will not be needed. Accordingly, the device configuration of the furnace body is simplified, leading to the ease of controlling the sintering temperature and the atmosphere.

In the cooling zone Z2, the cooling chamber 207 is provided with an oxygen introduction port 504 and an exhaust port 603 arranged in this order from the entrance 203. These ports 504 and 603 are arranged in an intermediate portion of the upper surface of the cooling chamber 207 close to the exit 204. The oxygen introduction port 504 is an aperture communicating with the oxygen introduction path 500. The exhaust port 603 is an aperture communicating with the exhaust path 600. A flow of oxygen occurs between the oxygen introduction port 504 and the exhaust port 603 in the cooling zone Z2. Since the section where the oxygen flows is distant from the heating zone Z1, the temperature in the heating zone Z1 will not decrease. Because the oxygen introduction port 504 is in the cooling zone Z2, the atmosphere in the continuous furnace 100 can be adjusted. Accordingly, the continuous furnace 100 including the heating zone Z1 can be controlled to create a desired oxygen concentration. Oxygen gas is blown to the containers 202 which have been cooled by natural air in the heating zone Z1 side cooling room 207, specifically in the section where the oxygen flow is occurring. By doing so, cooling of the container 202 can be accelerated. The length of the cooling zone Z2 is appropriately adjusted depending on the sintering temperature, the conveying speed or the like, so as to bring the temperature of the container 202 heated in the exit 204 back to substantially normal temperature.

The heating zone Z1 and the cooling zone Z2 are respectively installed with the exhaust port 602 and 603 as exhaust means. The heating zone Z1 and the cooling zone Z2 are respectively installed with the oxygen introduction port 503 and 504 as oxygen introduction means.

In the continuous furnace 100 with the aforementioned configuration, the conveyor 201 is driven at a predetermined conveying speed by the control section 400. The alumina molded body 11 in each container 202 placed on the driven conveyor 201 is conveyed into the heating zone Z1 from the entrance 203. In the heating zone Z1, the alumina molded body 11 is heated to not less than the sintering temperature of an organic binder (for example, 700° C. or more) that is a raw material of the alumina molded body 11, while passing through the temperature rising heating chamber 205. While the organic binder is combusted and removed, the temperature is increased to the predetermined sintering temperature. Then, the alumina molded body 11 is held for a predetermined time at a predetermined sintering temperature, so that it is turned into the alumina sintered body 12 in the isothermal heating chamber 206. The sintering temperature is set to be not less than the sintering temperature of the alumina sintered body 12. Generally, the sintering temperature is set as appropriate so as to fall within the range of 1200 to 1600° C.

The control section 400 controls the temperature in the heating zone Z1, while adjusting the oxygen concentration to create a desired high oxygen concentration, based on a predetermined sintering profile. The oxygen concentration in the heating zone Z1 needs to be over 20 mol % to improve voltage resistance of the alumina sintered body 12. Preferably, the oxygen concentration is much higher than that in the air (for example, approximately 21 mol %). For example, the sintering atmosphere is adjusted such that the oxygen concentration in the heating zone Z1 falls within the range of 40 mol % to 100 mol %. Accordingly, the atmospheric gas remaining between the particles of the alumina sintered body 12 is reduced and sintering of the alumina is accelerated, and thus higher sintering density compared to that of the prior art can be obtained.

Preferably, the ambient pressure in the heating zone Z1 is not less than atmospheric pressure. For example, the oxygen partial pressure is adjusted so as to fall within the range of 0.04 MPa to 1 MPa. When the oxygen partial pressure in the heating zone Z1 is between 0.04 MPa to 0.1 MPa, the oxygen concentration in the heating zone Z1 becomes 40 mol % to 100 mol %. Accordingly, sintering under a high oxygen atmosphere can be accomplished. By increasing the amount of oxygen introduced into the continuous furnace 100, the ambient pressure in the heating zone Z1 can be made higher than atmospheric pressure. Preferably, the oxygen partial pressure is 0.06 MPa or more, and the higher the oxygen partial pressure is, the denser the obtained sintered body can be.

Therefore, in the continuous furnace 100, the oxygen introduction path 500 not only communicates with the heating zone Z1, but also with the cooling zone Z2 and the purge zone Z3. The continuous furnace 100 introduces oxygen from a plurality of oxygen introduction ports 502, 503, 504 and 505. The ambient pressure in the continuous furnace 100 can be adjusted by discharging the atmospheric gas to the outside of the continuous furnace 100 from a plurality of exhaust ports 601, 602, 603 and 604. In this regard, the more the oxygen flows from the oxygen introduction path 500 into the plurality of oxygen introduction ports 502, 503, 504 and 505, the higher the oxygen partial pressure in the isothermal heating chamber 206 becomes.

The control section 400 adjusts the oxygen flow rate in the continuous furnace 100 so as to control the oxygen concentration in the continuous furnace 100 to create a desired oxygen concentration by using, for example, the detection result of the oxygen concentration sensor provided in the exhaust port 600. The control section 400 can adjust the amount of oxygen introduced from the oxygen introduction path 500 and the volume of the atmospheric gas exhausted to the exhaust port 600, and can maintain the ambient pressure in the continuous furnace 100 to be higher than atmospheric pressure. Accordingly, the oxygen partial pressure in the isothermal heating chamber 206 can be increased to 0.1 MPa or more.

In this case, preferably, the body of the continuous furnace 100 is configured to be pressure resistant. Furthermore, when the continuous furnace 100 is configured to provide a pressure resistant door between the furnace body and the entrance 203 and between the furnace body and the exit 204, further increase in the pressure inside the continuous furnace 100 can be obtained. In this regard, the oxygen partial pressure can be adjusted to fall within the range of 0.1 MPa to 1 MPa.

As described above, according to the present embodiment, the alumina sintered body 12 having high voltage resistance can be obtained by controlling the atmosphere in the continuous furnace 100 to be a predetermined high oxygen concentration in the sintering step (B). Accordingly, the productivity of the spark plug insulator increases, since no sintering additive is required to be added or a long sintering time is not required to be used for the progress of sintering.

Specifically, the electric heater 401 or the like is used which does not consume oxygen when heating the heating zone Z1 of the continuous furnace 100. The heating zone Z1 is provided with the oxygen introduction port 503 and the exhaust port 602. The cooling zone Z2 is provided with the oxygen introduction port 504 and the exhaust port 603. The introduction amount of oxygen is adjusted at the oxygen introduction ports 503 and 504, and the atmosphere in the continuous furnace 100 is discharged from the exhaust ports 602 and 603. Accordingly, the interior of the continuous furnace 100 can be controlled to create a desired high oxygen atmosphere. Moreover, the purge zone Z3 is provided at the upstream end of the heating zone Z1. The purge zone Z3 is also provided at the downstream end of the cooling zone Z2 in the conveying direction. The atmospheric gas in the purge zone Z3 is expelled by replacing in advance the atmospheric gas in the purge zone Z3 with nitrogen. After expelling the atmospheric gas, oxygen is introduced into the purge zone Z3, and thus the oxygen concentration is accurately controlled. Accordingly, the spark plug insulator 1 having a high voltage resistance can be produced by using the alumina sintered body 12 as a base material obtained through the steps in the continuous furnace 100.

TEST EXAMPLE

Figure 4:
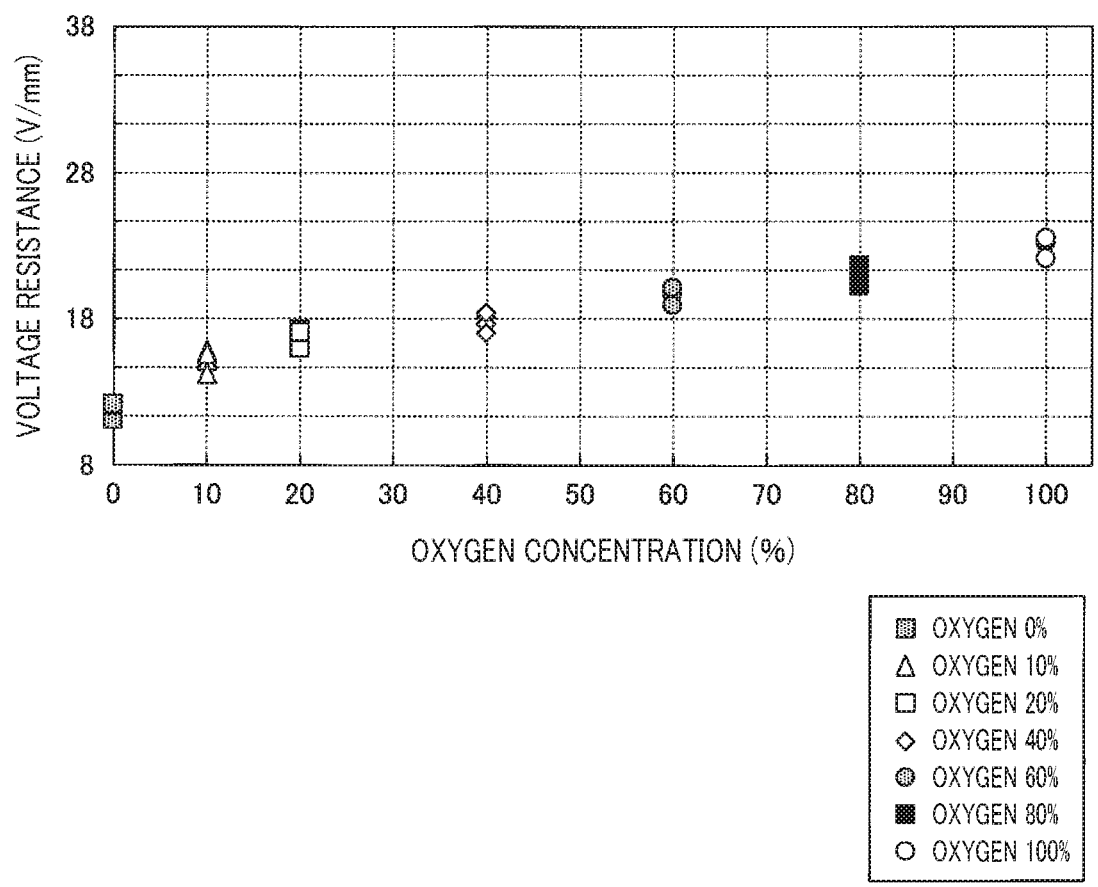
FIG. 4 is a diagram showing a relationship between oxygen concentration and voltage resistance characteristics according to an example.

Next, a study was conducted of the influence on the voltage resistance characteristics when the oxygen concentration was changed, as shown in FIG. 4, in the sintering step (B) of the alumina sintered body 12.

Firstly, an alumina molded body 11 was prepared in the molding step (A). A high purity alumina ($Al_2O_3$) powder was used as a molding raw material, which had an average particle size of 2 μm to 5 μm and a purity of 99.48% to 99.8%. A suitable amount of organic binder serving as a molding additive was added to the molding raw material, followed by adding water thereto to obtain a slurry. The slurry was dried and granulated. Then, the alumina molded body 11 having the shape of an insulator was obtained through press molding.

Then, in the sintering step (B), the obtained alumina molded body 11 was sintered in an atmospherically adjusted test sintering furnace located in the continuous furnace 100. The sintered alumina molded body 11 was used as the alumina sintered body 12. The temperature rise rate in the sintering furnace was set to 2000° C./hr, the sintering temperature was set to 1570° C., and sintering time was set to 15 minutes. The oxygen flow rate in the sintering furnace was adjusted to set the oxygen concentration in the continuous furnace 100 to 0, 10, 20, 40, 60, 80, 100 mol % (the oxygen partial pressure in atmospheric pressure was set to 0, 0.01, 0.02, 0.04, 0.06, 0.08, 0.1 MPa). Under each oxygen concentration, a plurality of alumina sintered bodies 12 to be used as samples for measuring the voltage resistance (hereinafter referred to as "sample(s)") were prepared using the continuous furnace 100 (i.e., number of sample n=5).

A known voltage resistant measurement device was used to measure the voltage resistance of the obtained alumina sintered bodies 12. The voltage resistance was measured as follows. The inner electrode of the voltage resistant measurement device was inserted into the cylindrical alumina sintered body 12 having a shape of the spark plug insulator 1 as shown in FIG. 1. The outer electrode having a ring shape was fitted to the outer periphery of the cylindrical alumina sintered body 12. The inner and outer electrodes were arranged so that the shortest distance therebetween was the same between samples. A high voltage was applied across the inner and outer electrodes. The high voltage was generated by an oscillator and a coil from a constant voltage power supply. The applied voltage was increased stepwise at a given rate while being monitored with an oscilloscope. The applied voltage at the time when the alumina sintered body 12 was dielectrically broken down was taken to be the sample's voltage resistance. (Unit: kV/mm)

FIG. 4 shows the measurement result of the voltage resistance obtained from the samples, with the oxygen concentration being indicated on the lateral axis, and the voltage resistance, on the longitudinal axis. As shown in FIG. 4, the voltage resistance increased as the oxygen concentration increased. When the oxygen concentration exceeds 20 mol % (substantially the same as the oxygen concentration in the air), the voltage resistance becomes 18 kV/mm or more, and thus a good result can be obtained. When the oxygen concentration is 40 mol % or more, the voltage resistance becomes approximately at least 20 kV/mm or more. Accordingly, the voltage resistance characteristics of the samples were confirmed to be improved by sintering the alumina molded body 11 under the atmosphere adjusted to high oxygen concentration.

Figure 5:
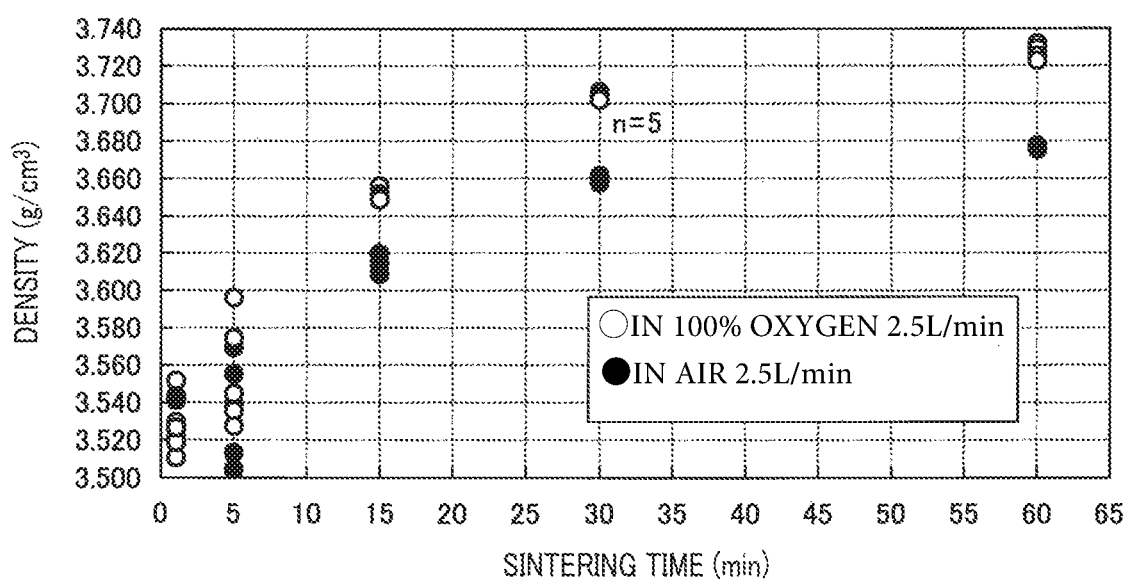
FIG. 5 is a diagram showing a relationship between sintering time and sintering density according to the example.

FIG. 5 is a diagram showing a relationship between sintering time and sintering density of the alumina sintered bodies 12 in the sintering furnace. The flow rate of the oxygen introduced into the sintering furnace was set to 2.5 L/min (i.e., the oxygen concentration was 100 mol %; the oxygen partial pressure was 0.1 MPa), and sintering time was changed within the range of 1 to 60 minutes. As a comparison, the air was introduced into the sintering furnace (i.e., the introduction amount of the air was 2.5 L/min). Sintering density of the obtained alumina sintered bodies 12 is shown in FIG. 5. Sintering time of the alumina sintered body 12 at the time of introducing the air into the sintering furnace was changed within the range of 1 to 60 minutes. As shown in FIG. 5, sintering time increased as sintering density increased. Sintering density of the alumina sintered body 12 was compared by sintering the alumina sintered body 12 in the atmospheric air and in a high oxygen atmosphere for 15 minutes or more. Sintering under the high oxygen atmosphere obviously exhibited more improvement than when sintered in the atmospheric air.

Figure 6:
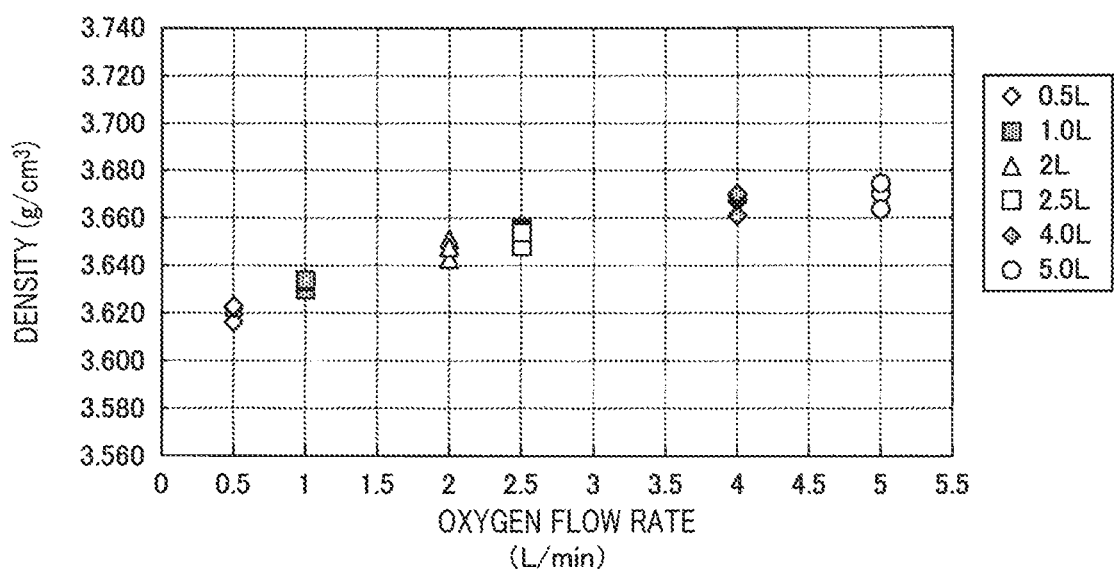
FIG. 6 is a diagram showing a relationship between oxygen flow rate and sintering density according to an example.

Next, the flow rate of the oxygen introduced to the sintering furnace was changed within the range of 0.5 to 5 L/min, and sintering density of the alumina sintered body 12 obtained in the same manner as in the test example was examined. As shown in FIG. 6, sintering density increased as the oxygen flow rate increased. When the oxygen flow rate was 2.5 L/min (i.e., the oxygen concentration was 100 mol %; the oxygen partial pressure was 0.1 MPa), sintering density was approximately 3.65 kg/mm. When the oxygen flow rate was further increased, sintering density was increased accordingly, and when the oxygen flow rate was 5 L/min, sintering density was approximately 3.67 kg/mm. Increase in the oxygen flow rate allowed the pressure in the sintering furnace to increase, which led to the further increase in the oxygen partial pressure. From this, it is understood that the sinterability of the alumina sintered body 12 is improving.

The present invention is not limited to the embodiments described above, and various modifications can be made without departing from the spirit of the present invention. An example of the continuous furnace 100 used in the aforementioned first embodiment is not limited to have the configuration shown in FIG. 3, but can be a configuration that actualizes the method of production of the present invention. In this regard, the conveyor 201 can be configured as a belt type conveyor instead of the roller type conveyor, or alternatively, a carriage typefeed-ing means can be used. The means for heating the heating zone Z1 is not limited to the electric heater 401, but any means can be used as long as the means is an electrical heating means which does not consume oxygen. The arrangement of the electric heater 401 or the connecting position or the like of the oxygen introduction path 500, the exhaust port 600, and the nitrogen introduction path 700 can be changed as appropriate.

REFERENCE SIGNS LIST

1 Spark plug insulator
11 Alumina molded body
12 Alumina sintered body
100 Continuous furnace
401 Electric heater (Heating means)
502, 503, 504, 505 Oxygen introduction port (Oxygen introduction means)
601, 602, 603, 604 Exhaust port (Exhaust means)
Z1 Heating zone
Z2 Cooling zone
Z3 Purge zone

The invention claimed is:
1. A method of producing a spark plug insulator, comprising;
 a molding step (A) of preparing an alumina molded body from a molding raw material which contains an alumina raw material powder having an average particle size of 2 μm to 5 μm and a molding additive; and
 a sintering step (B) of preparing an alumina sintered body to produce a spark plug insulator, by sintering the alumina molded body; wherein
 in the sintering step (B), the alumina molded body is conveyed through a continuous furnace provided with a heating zone which is heated to 700° C. to 1600° C. by a heating means, while introducing an oxygen gas to the continuous furnace to control the heating zone to have a high oxygen atmosphere with an oxygen concentration within a range of 40 mol % to 100 mol %.

2. The method of producing a spark plug insulator according to claim 1, wherein the heating means is a heating means which does not use any oxygen in the heating zone.

3. The method of producing a spark plug insulator according to claim 1, wherein the continuous furnace includes a cooling zone at a downstream side of the heating zone in a conveying direction, and oxygen introduction means is provided for introducing oxygen gas into the heating zone and the cooling zone to adjust an amount of oxygen introduced from the oxygen introduction means.

4. The method of producing a spark plug insulator according to claim 3, wherein an exhaust means is provided at an upstream side of the heating zone in a conveying direction of the oxygen introduction means, and at a downstream side of the cooling zone in a conveying direction of the oxygen introduction means to adjust an amount of oxygen introduced from the oxygen introduction means, and a volume of exhaust of an atmospheric gas in the continuous furnace exhausted from the exhaust means.

5. The method of producing a spark plug insulator according to claim 3, wherein
   an entrance including an oxygen introduction means is provided at an upstream side of the heating zone in a conveying direction; and
   an exit including an oxygen introduction means is provided at a downstream side in a conveying direction of the heating zone to introduce oxygen gas into the entrance and the exit from the oxygen introduction means.

6. The method of producing a spark plug insulator according to claim 5, comprising; a purge zone having a nitrogen introduction means for introducing nitrogen gas, and an exhaust means to introduce oxygen gas to an atmospheric gas purged with a nitrogen, the purge zone being provided at an upstream side in a feeding direction of the oxygen introduction means of the entrance, and at a downstream side in a conveying direction of the oxygen introduction means of the exit.

7. The method of producing a spark plug insulator according to claim 1, wherein an oxygen partial pressure in the heating zone is controlled to fall within a range of 0.04 MPa to 1 MPa.

* * * * *